(12) United States Patent
Kim

(10) Patent No.: US 12,155,335 B2
(45) Date of Patent: Nov. 26, 2024

(54) ELECTRONIC PARKING BRAKE SYSTEM AND CONTROL METHOD THEREFOR

(71) Applicant: HL MANDO CORPORATION, Pyeongtaek-si (KR)

(72) Inventor: Wookhyeon Kim, Suwon-si (KR)

(73) Assignee: HL MANDO CORPORATION, Gyeonggi-Do (KR)

( * ) Notice: Subject to any disclaimer, the term of this patent is extended or adjusted under 35 U.S.C. 154(b) by 235 days.

(21) Appl. No.: 17/779,378

(22) PCT Filed: Nov. 19, 2020

(86) PCT No.: PCT/KR2020/016355
§ 371 (c)(1),
(2) Date: May 24, 2022

(87) PCT Pub. No.: WO2021/107501
PCT Pub. Date: Jun. 3, 2021

(65) Prior Publication Data
US 2022/0399849 A1 Dec. 15, 2022

(30) Foreign Application Priority Data
Nov. 27, 2019 (KR) .......................... 10-2019-0154786

(51) Int. Cl.
*B60T 5/00* (2006.01)
*B60T 8/171* (2006.01)
(Continued)

(52) U.S. Cl.
CPC .............. *H02P 29/60* (2016.02); *B60T 8/171* (2013.01); *B60T 8/172* (2013.01); *B60T 13/746* (2013.01);
(Continued)

(58) Field of Classification Search
CPC .................................. H02P 29/60; B60T 5/00
See application file for complete search history.

(56) References Cited

U.S. PATENT DOCUMENTS

2006/0261764 A1* 11/2006 Erben ..................... B60T 7/045
318/139
2012/0085599 A1* 4/2012 Ito ......................... B60T 13/741
188/72.6
(Continued)

FOREIGN PATENT DOCUMENTS

DE 10361042 5/2005
JP 2018-001824 A 1/2018
(Continued)

OTHER PUBLICATIONS

Deutsches Patent—und Markenamt Application No. 112020005779.8, Office Action dated Nov. 7, 2023, 5 pages.
(Continued)

*Primary Examiner* — Long T Tran
(74) *Attorney, Agent, or Firm* — LEE, HONG, DEGERMAN, KANG & WAIMEY

(57) ABSTRACT

The present disclosure relates to an electronic parking brake system including a motor actuator operated by an electric motor, wherein the electronic parking brake system further includes a motor driving circuit provided to drive the electric motor, and a controller configured to determine a temperature of the electric motor from a temperature of a brake disc during a parking operation, determine a target current based on the determined motor temperature, and control the electric motor depending on the determined target current.

11 Claims, 12 Drawing Sheets

(51) Int. Cl.
  *B60T 8/172* (2006.01)
  *B60T 13/74* (2006.01)
  *F16D 65/18* (2006.01)
  *H02P 23/14* (2006.01)
  *H02P 29/60* (2016.01)
  *F16D 66/00* (2006.01)
  *F16D 121/24* (2012.01)

(52) U.S. Cl.
  CPC ............... *F16D 65/18* (2013.01); *H02P 23/14* (2013.01); *F16D 2066/001* (2013.01); *F16D 2121/24* (2013.01)

(56) References Cited

U.S. PATENT DOCUMENTS

| | | | | |
|---|---|---|---|---|
| 2014/0149012 | A1* | 5/2014 | Shiraki | B60T 13/741 701/70 |
| 2014/0172259 | A1* | 6/2014 | Blattert | B60T 8/172 701/70 |
| 2015/0120163 | A1* | 4/2015 | Ohara | F16D 65/18 701/70 |
| 2015/0217738 | A1* | 8/2015 | Blattert | B60T 7/122 701/70 |
| 2016/0176388 | A1* | 6/2016 | Baehrle-Miller | B60T 8/171 701/70 |
| 2018/0141533 | A1 | 5/2018 | Rifici | |
| 2021/0354679 | A1* | 11/2021 | Putz | B60T 17/221 |

FOREIGN PATENT DOCUMENTS

| | | |
|---|---|---|
| KR | 10-2013-0061582 A | 6/2013 |
| KR | 10-2016-0088076 A | 7/2016 |
| KR | 10-2017-0065875 A | 6/2017 |

OTHER PUBLICATIONS

The State Intellectual Property Office of the People's Republic of China Application Serial No. 202080082200.X, Office Action dated Oct. 8, 2023, 3 pages.

International Search Report (PCT/ISA/210) issued in PCT Application No. PCT/KR2020/016355 dated Feb. 24, 2021 with English Translation.

Written Opinion (PCT/ISA/237) issued in PCT Application No. PCT/KR2020/016355 dated Feb. 24, 2021.

* cited by examiner

[FIG. 1]
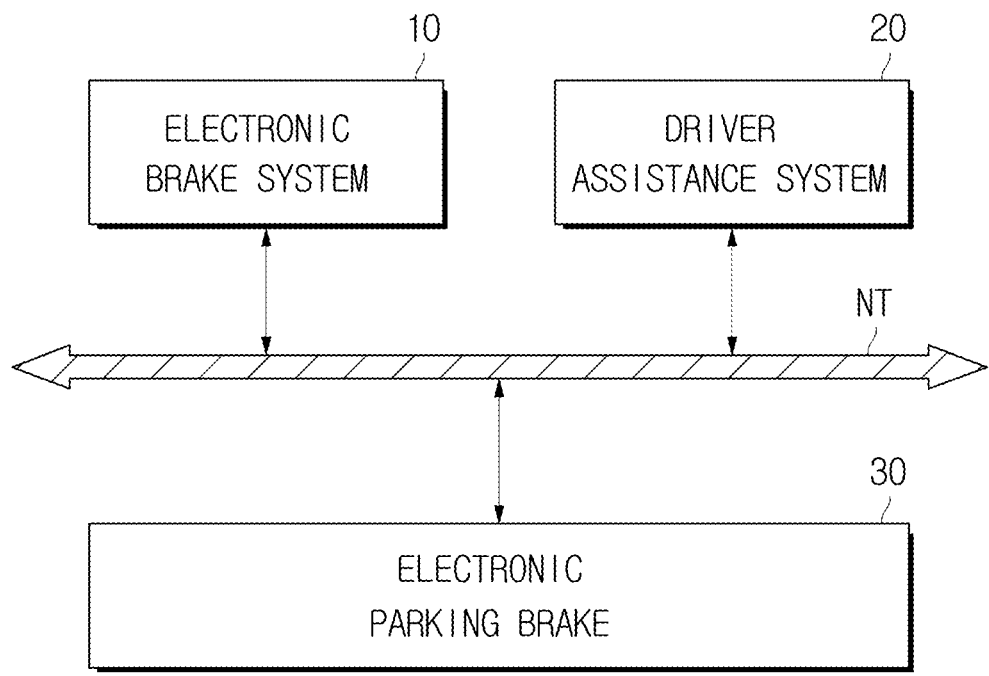

[FIG. 2]
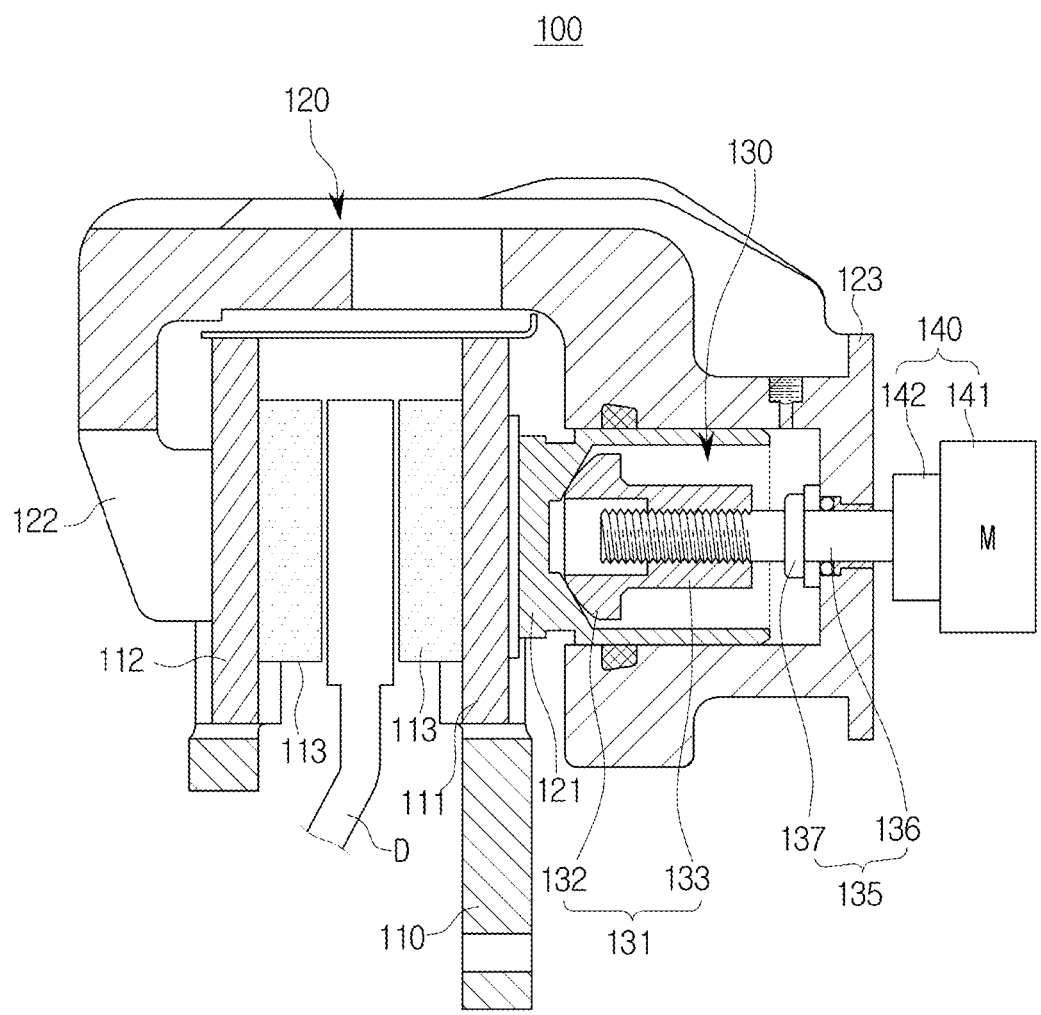

[FIG. 3]
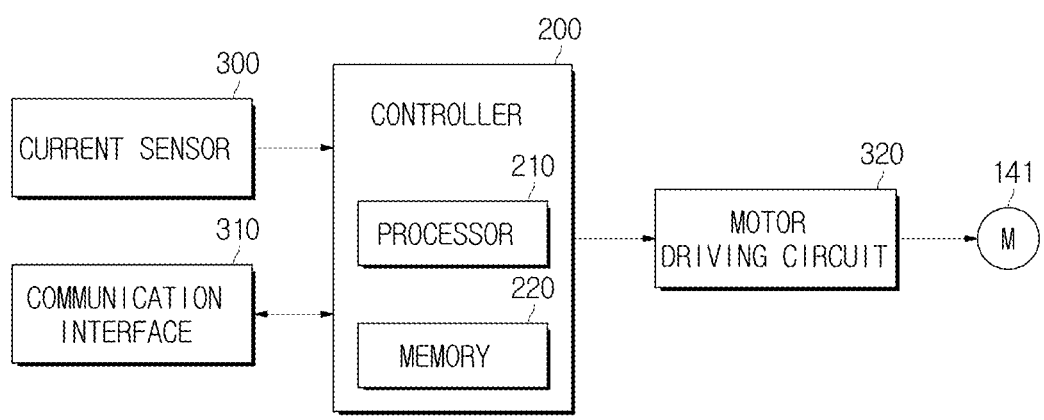

[FIG. 4]
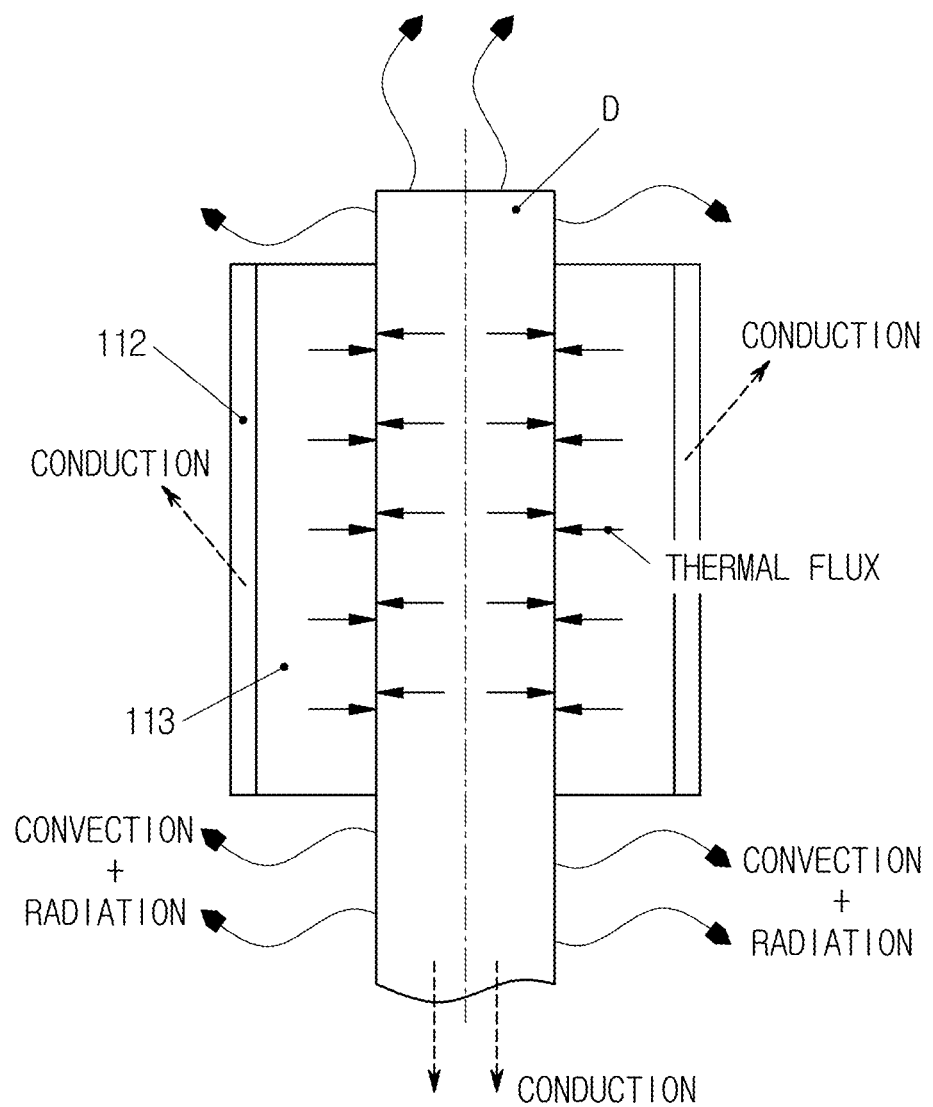

[FIG. 5]
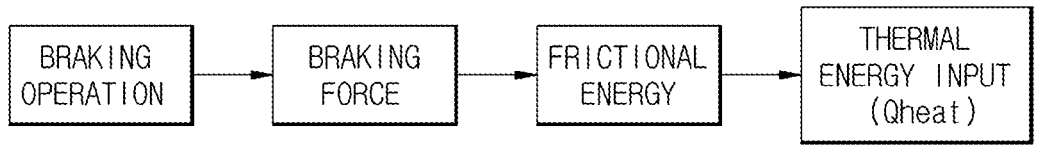

[FIG. 6]
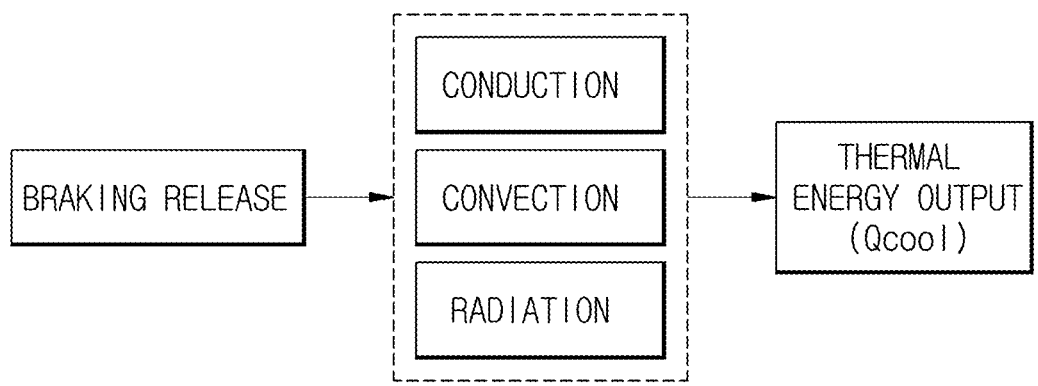

[FIG. 7]
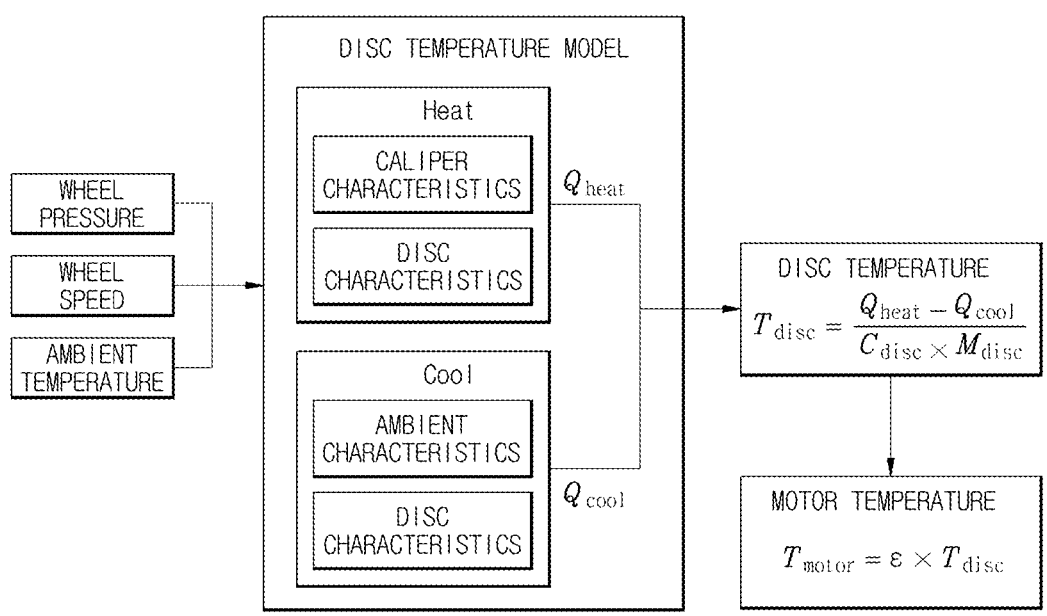

[FIG. 8]
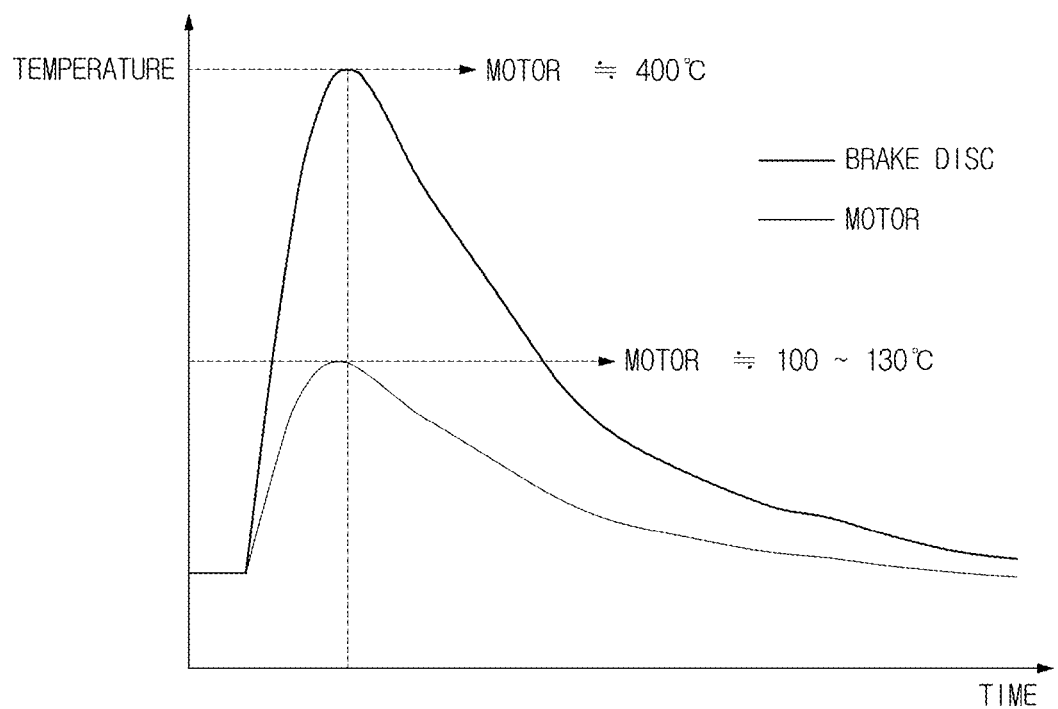

[FIG. 9]
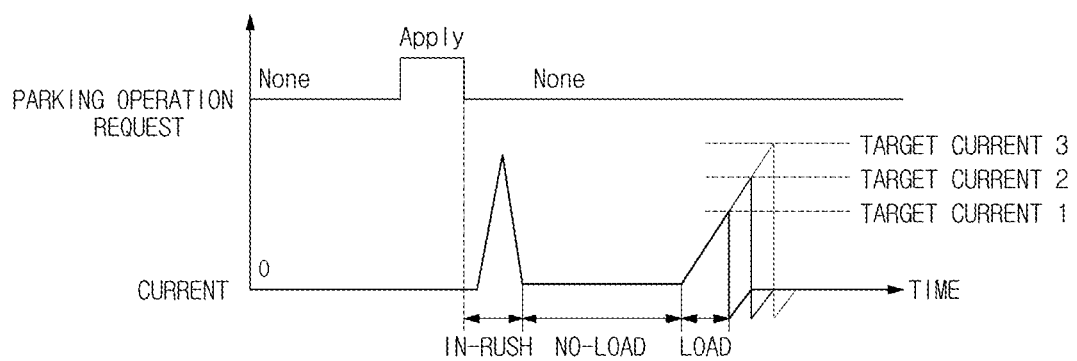

[FIG. 10]
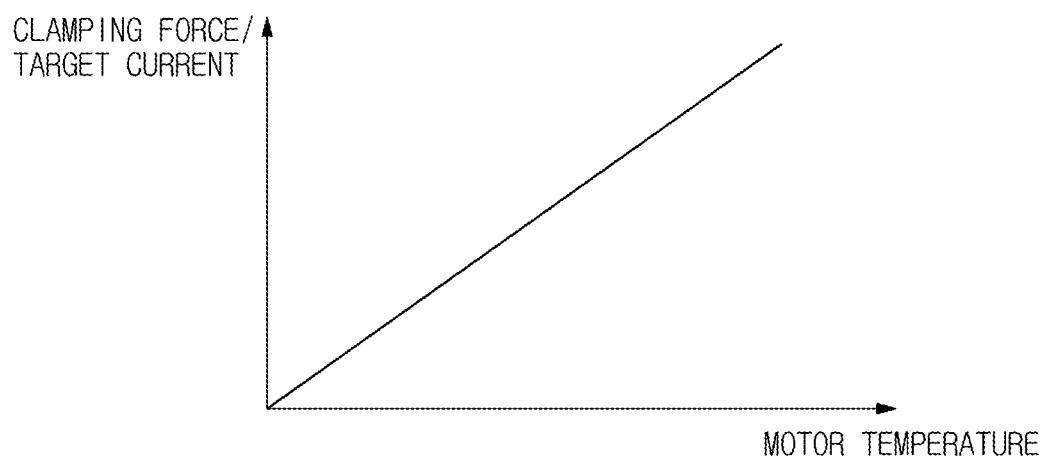

[FIG. 11]
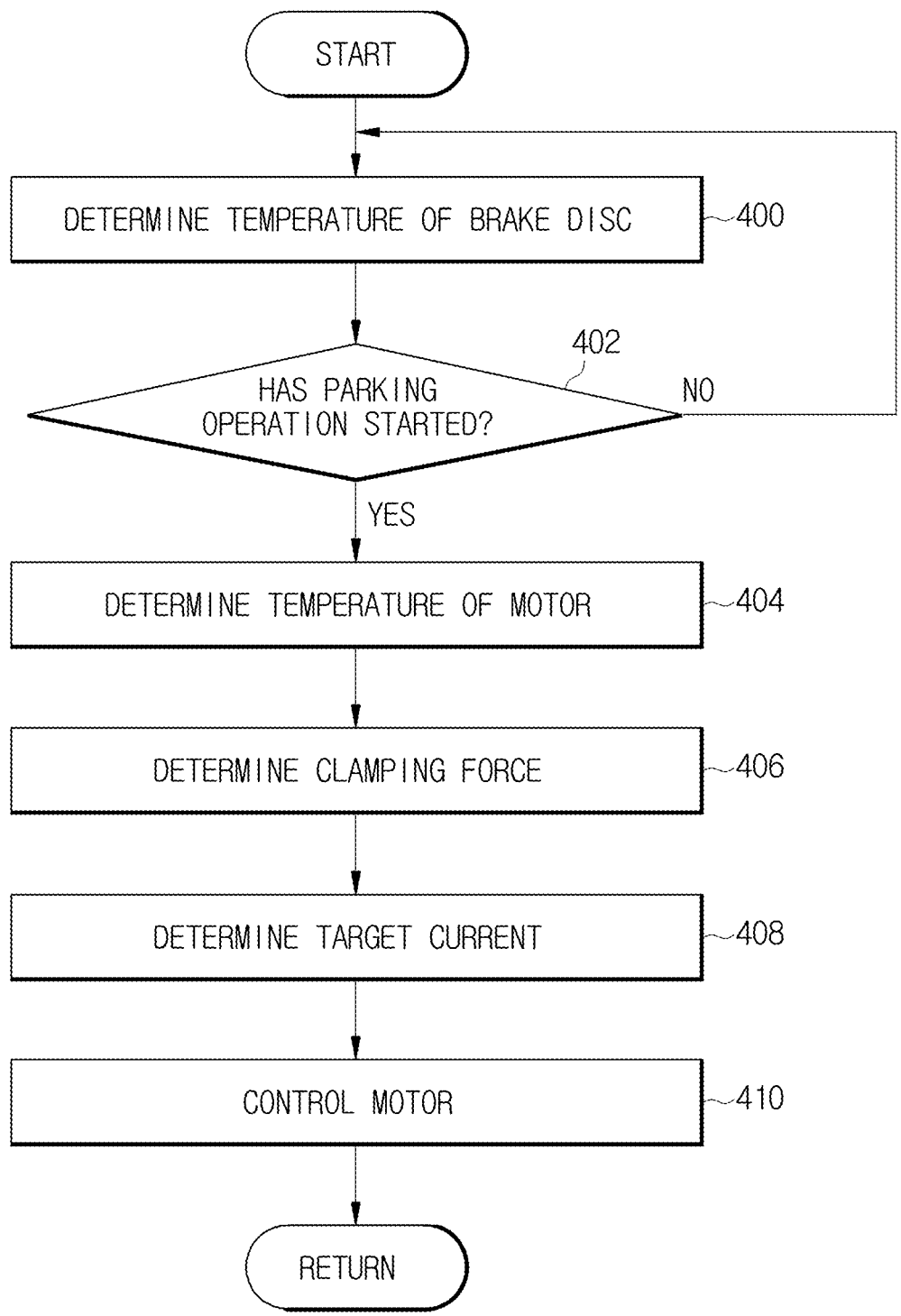

[FIG. 12]
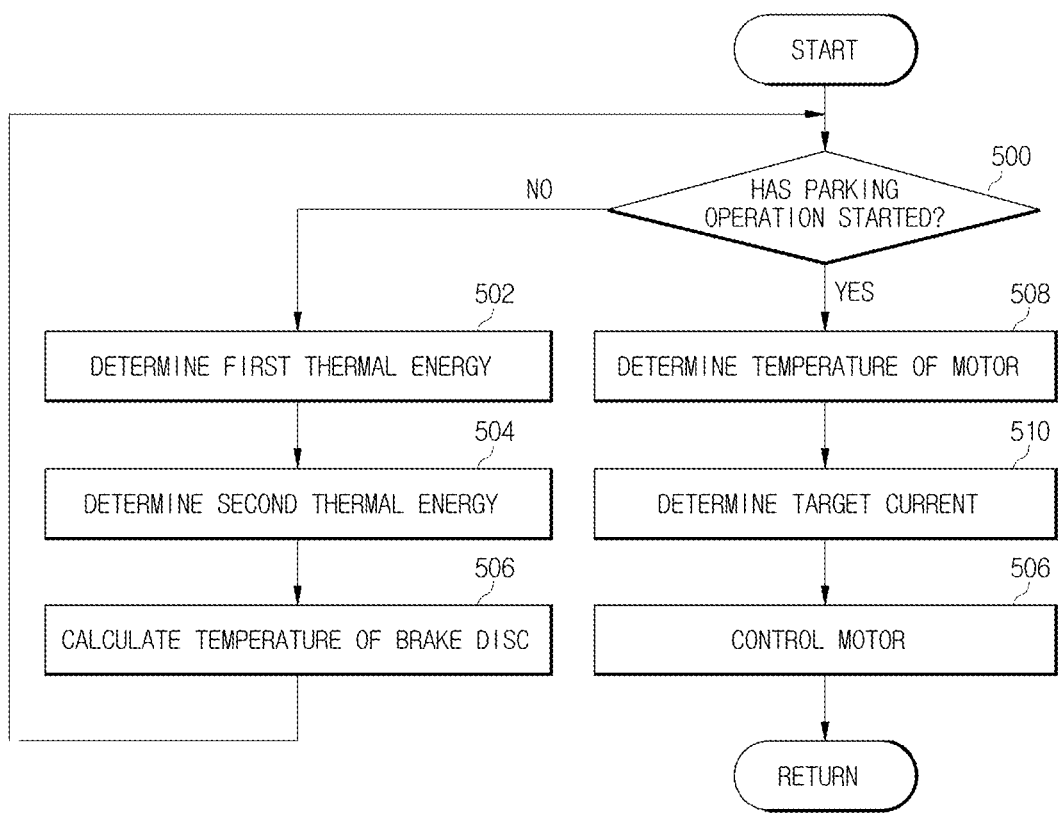

ELECTRONIC PARKING BRAKE SYSTEM AND CONTROL METHOD THEREFOR

CROSS-REFERENCE OF RELATED APPLICATIONS

This application is the U.S. National Phase under 35 U.S.C. § 371 of International Patent Application No. PCT/KR2020/016355, filed on Nov. 19, 2020, which claims the benefit of Korean Patent Application No. 10-2019-0154786, filed on Nov. 27, 2019, the entire disclosures of each are incorporated by reference herein.

TECHNICAL FIELD

The present disclosure relates to a motor-on-caliper (MoC) type electronic parking brake system in which the motor is integrated into the caliper, which is mounted on a wheel of a vehicle, and operated, and a control method thereof.

BACKGROUND ART

A motor-on-caliper (MoC) type electronic parking brake system increases a torque generated from an electric motor through a speed reducer to generate a clamping force required for parking by a mechanical structure apparatus inside the caliper. In this case, a control factor to be uniquely provided in controlling the clamping force is a current signal. The electronic parking brake system terminates control of the clamping force by determining that a required clamping force has been met when a current reaches a certain value using the principle that the output torque of the motor is proportional to the current.

A temperature of the motor may have a different temperature from an ambient temperature due to the influence of a high-temperature brake disc after a vehicle is driven. That is, a temperature of the brake disc increases due to repeated braking while the vehicle is driving, and the temperature of the motor also increases due to the characteristics of the electronic parking brake positioned close to the brake disc.

The performance of the motor may vary depending on the ambient temperature. In particular, the performance of the motor tends to deteriorate rapidly at a high temperature compared to an ordinary temperature.

A case in which the clamping force is not constant due to the fluctuation of the motor temperature and the control is terminated while the clamping force is insufficiently formed may occur.

Conventionally, in order to compensate for the above case, a large margin for the clamping force is set, which may cause a decrease in competitiveness such as price and weight of the product.

DISCLOSURE

Technical Problem

The present disclosure is directed to providing an electronic parking brake system and a control method thereof capable of maintaining the braking performance of the system constant by varying a clamping force required for parking depending on a motor temperature.

Technical Solution

An aspect of the present disclosure provides an electronic parking brake system including a motor actuator operated by an electric motor, wherein the electronic parking brake system further includes a motor driving circuit provided to drive the electric motor, and a controller configured to determine a temperature of the electric motor from a temperature of a brake disc during a parking operation, determine a target current based on the determined motor temperature, and control the electric motor depending on the determined target current.

The controller may be configured to determine a clamping force required for parking based on the determined motor temperature and determine the target current depending on the determined clamping force.

The controller may be configured to determine the target current as a higher value as the determined motor temperature is higher.

The controller may be configured to determine first thermal energy to be generated during vehicle braking, determine second thermal energy to be cooled when the braking of the vehicle is released, and determine the temperature of the brake disc based on the determined first thermal energy and the determined second thermal energy.

The controller may be configured to calculate the first thermal energy depending on a friction coefficient of a brake pad, a wheel pressure, a wheel speed, a radius of the brake disc, and a radius of a wheel.

The controller may be configured to calculate the second thermal energy depending on a wheel speed, an ambient temperature, a radius of the brake disc, and a radius of a wheel.

The controller may be configured to calculate the temperature Tmotor of the electric motor by the following equation, $$T_{motor} = \varepsilon \times T_{disc}$$

and herein, Tdisc is the temperature of the brake disc, and c is a correction coefficient.

Another aspect of the present disclosure provides a control method of an electronic parking brake system including a motor actuator operated by an electric motor, wherein the control method includes determining a temperature of the electric motor from a temperature of a brake disc during a parking operation, determining a target current based on the determined motor temperature, and controlling the electric motor depending on the determined target current.

The determining of the target current may include determining a clamping force required for parking based on the determined motor temperature, and determining the target current depending on the determined clamping force.

The determining of the temperature of the brake disc may include determining first thermal energy to be generated during vehicle braking, determining second thermal energy to be cooled when the braking of the vehicle is released, and determining the temperature of the brake disc based on the determined first thermal energy and the determined second thermal energy.

The determining of the first thermal energy may include calculating the first thermal energy depending on a friction coefficient of a brake pad, a wheel pressure, a wheel speed, a radius of the brake disc, and a radius of a wheel.

The determining of the second thermal energy may include calculating the second thermal energy depending on a wheel speed, an ambient temperature, a radius of the brake disc, and a radius of a wheel.

The determining of the temperature of the electric motor may include calculating the temperature Tmotor of the electric motor by the following equation, $$T_{motor} = \varepsilon \times T_{disc}$$

and herein, Tdisc is the temperature of the brake disc, and c is a correction coefficient.

Advantageous Effects

According to an aspect of the present disclosure, the braking performance of an electronic parking brake system can be constantly maintained by varying a clamping force required for parking depending on a motor temperature.

DESCRIPTION OF DRAWINGS

FIG. 1 illustrates a vehicle to which an electronic parking brake system according to an embodiment is applied.

FIG. 2 illustrates a structure of the vehicle to which the electronic parking brake system according to an embodiment is applied.

FIG. 3 is a control block diagram of the electronic parking brake system according to an embodiment.

FIG. 4 illustrates an exchange of thermal energy of a brake disc in the electronic parking brake system according to an embodiment.

FIG. 5 is a diagram illustrating energy conversion during braking in the electronic parking brake system according to an embodiment.

FIG. 6 is a diagram illustrating energy conversion when the braking is released in the electronic parking brake system according to an embodiment.

FIG. 7 is a diagram illustrating estimation of a motor temperature in the electronic parking brake system according to an embodiment.

FIG. 8 is a graph illustrating a temperature relationship between the brake disc and a motor in the electronic parking brake system according to an embodiment.

FIG. 9 illustrates a pattern of a current input to the electric motor during a parking operation in the electronic parking brake system according to an embodiment.

FIG. 10 is a graph illustrating that a clamping force and a target current are determined depending on the motor temperature in the electronic parking brake system according to an embodiment.

FIG. 11 is a flowchart illustrating a control method of the electronic parking brake system according to an embodiment.

FIG. 12 is a flowchart illustrating a control method of the electronic parking brake system according to another embodiment.

MODE OF THE DISCLOSURE

Like reference numerals refer to like elements throughout the specification. This specification does not describe all the elements of the embodiments, and duplicative contents between general contents or embodiments in the technical field of the present disclosure will be omitted. The terms 'part,' 'module,' 'member,' and 'block' used in this specification may be embodied as software or hardware, and it is also possible for a plurality of 'parts,' 'modules,' 'members,' and 'blocks' to be embodied as one component, or one 'part,' 'module,' 'member,' and 'block' to include a plurality of components according to embodiments.

Throughout the specification, when a part is referred to as being "connected" to another part, it includes not only a direct connection but also an indirect connection, and the indirect connection includes connecting through a wireless network.

Also, when it is described that a part "includes" an element, it means that the element may further include other elements, not excluding the other elements unless specifically stated otherwise.

Throughout the specification, when a member is described as being "on" another member, this includes not only a case in which a member is in contact with another member but also a case in which another member is present between the two members.

The terms 'first,' 'second,' etc. are used to distinguish one element from another element, and the elements are not limited by the above-mentioned terms. The singular forms "a," "an," and "the" include plural referents unless the context clearly dictates otherwise.

In each step, an identification numeral is used for convenience of explanation, the identification numeral does not describe the order of the steps, and each step may be performed differently from the order specified unless the context clearly states a particular order.

FIG. 1 illustrates a vehicle to which an electronic parking brake system according to an embodiment is applied.

Referring to FIG. 1, a vehicle may include an electronic brake system 10, a driver assistance system 20, and an electronic parking brake system 30.

The electronic brake system 10 may control a brake apparatus in response to a braking intention of a driver through a brake pedal and/or slip of wheels.

The electronic brake system 10 may be an anti-lock braking system (ABS) capable of temporarily releasing the braking of the wheels in response to the slip of the wheels detected when a vehicle is braked. Also, the electronic brake system 10 may be an electronic stability control (ESC) capable of selectively releasing the braking of the wheels in response to oversteering and/or understeering detected when the vehicle is steered. Also, the electronic brake system 10 may be a traction control system (TCS) capable of temporarily the braking the wheels in response to the slip of the wheels detected when the vehicle is driven.

The driver assistance system 20 may determine whether emergency braking of the vehicle is required depending on an acceleration intention of the driver when a pedestrian and/or obstacle exists in a detection area depending on a gear state among a front detection area and a rear detection area of the vehicle when the vehicle starts after stopping, and warn the driver or perform emergency braking of the vehicle 1 depending on the determination result. Specifically, the driver assistance system 20 may recognize a change amount in an accelerator pedal from a position of the accelerator pedal detected through an accelerator pedal sensor when a pedestrian and/or an obstacle exists in the detecting area, determine whether emergency braking of the vehicle is required based on the recognized amount of change in the accelerator pedal, and perform emergency braking of the vehicle when emergency braking is required.

The driver assistance system 20 may be implemented as a forward collision avoidance (FCA) system, an autonomous emergency brake (AEB) system, a lane departure warning (LDW) system, a lane keeping assist (LKA) system, a smart parking assist (SPA) system, a driver attention warning (DAW) system, a smart cruise control (SCC) system, a blind spot detection (BSD) system, or the like.

The electronic parking brake system 30 may communicate with the electronic brake system 10 and the driver assistance system 20 through a vehicle communication network NT. The systems may transmit and receive data through Ethernet, MOST (Media Oriented Systems Transport), Flexray, CAN (Controller Area Network) LIN (Local Interconnect Network), and the like.

FIG. 2 illustrates a structure of the vehicle to which the electronic parking brake system (EPB) according to an embodiment is applied.

Referring to FIG. 2, an electronic parking brake 100 may include a carrier 110 on which a pair of pad plates 111 and 112 are installed to be movable forward or backward to press a brake disc D rotating together with a wheel of a vehicle, a caliper housing 120 provided with a cylinder 123 slidably installed on the carrier 110 and in which a piston 121 is installed to move forward or backward by a braking hydraulic pressure, a power conversion unit 130 that presses the piston 121, and a motor actuator 140 to transmit a rotational force to the power conversion unit 130 using a motor M.

The pair of pad plates 111 and 112 include the inner pad plate 111 disposed to contact the piston 121 and the outer pad plate 112 disposed to contact a finger portion 122 of the caliper housing 120. The pair of pad plates 111 and 112 are installed on the carrier 110 fixed to a vehicle body so as to be movable forward or backward toward opposite sides of the brake disc 1), In addition, a brake pad 113 is attached to one surface of each of the pad plates 111 and 112 facing the brake disc D.

The caliper housing 120 is slidably installed on the carrier 110. More specifically, the caliper housing 120 includes the cylinder 123 provided at a rear portion and in which the power conversion unit 130 is installed and the piston 121 is provided to be movable forward and backward, and the finger portion 122 provided at a front portion and formed to be bent in a downward direction to operate the outer pad plate 112. The finger portion 122 and the cylinder 123 are formed integrally.

The piston 121 is provided in a cylindrical form having a cup shape to be slidably inserted into the cylinder 123. The piston 121 presses the inner pad plate 111 toward the brake disc D by an axial force of the power conversion unit 130 to which the rotational force of the motor actuator 140 is transmitted. Accordingly, when the axial force of the power conversion unit 130 is applied, the piston 121 moves forward toward the inner pad plate 111 to press the inner pad plate 111, and the caliper housing 120 operates in a direction opposite to the piston 121 by a reaction force, so that the finger portion 122 presses the outer pad plate 112 toward the brake disc D to perform braking.

The power conversion unit 130 may serve to press the piston 121 toward the inner pad plate 111 by the rotational force transmitted from the motor actuator 140. The power conversion unit 130 may include a nut member 131 installed so as to be disposed in the piston 121 and in contact with the piston 121, and a spindle member 135 screwed to the nut member 131.

The nut member 131 may be disposed in the piston 121 in a state in which rotation is restricted to be screwed with the spindle member 135, The nut member 131 may include a head portion 132 provided to be in contact with the piston 121, and a coupling portion 133 formed to extend from the head portion 132 and having female threads formed on an inner circumferential surface thereof to be screwed with the spindle member 135.

The nut member 131 may move in a forward direction or a backward direction depending on the rotation direction of the spindle member 135 to serve to press and release the piston 124. In this case, the forward direction may be a moving direction in which the nut member 131 approaches the piston 121. The backward direction may be a moving direction in which nut member 131 becomes away from the piston 121. In addition, the forward direction may be a moving direction in which the piston 121 approaches the brake pad 113. The backward direction may be a moving direction in which the piston 121 becomes away from the brake pad 113.

The spindle member 135 may include a shaft portion 136 provided to pass through the rear portion of the caliper housing 120 to be rotated by the rotational force transmitted from the motor actuator 140, and a flange portion 137 formed to extend in a radial direction from the shaft portion 136. One side of the shaft portion 136 may be rotatably installed through a rear side of the cylinder 123, and the other side of the shaft portion 136 may be disposed in the piston 121. In this case, one side of the shaft portion 136 passing through the cylinder 123 is connected to an output shaft of a speed reducer 142 to receive the rotational force of the motor actuator 140.

The motor actuator 140 may include an electric motor 141 and the speed reducer 142.

The electric motor 141 may press or release the piston 121 by moving the nut member 131 forward or backward by rotating the spindle member 135.

The speed reducer 142 may be provided between an output side of the electric motor 141 and the spindle member 135.

Through the configuration as described above, the electronic parking brake may move the nut member 131 by rotating the spindle member 135 in one direction using the motor actuator 140 to press the piston 121 in a parking operation mode. The piston 121 pressed by the movement of the nut member 131 presses the inner pad plate 111 to come the brake pad 113 into close contact with the brake disc 1), thereby generating a clamping force.

In addition, the electronic parking brake rotates the spindle member 135 in the opposite direction using the motor actuator 140 in a parking release mode, so that the nut member 131 pressed against the piston 121 may move backward. The pressing against the piston 121 may be released by the backward movement of the nut member 131. When the pressing against the piston 121 is released, the clamping force generated by the brake pad 113 being separated from the brake disc D may be released.

FIG. 3 is a control block diagram of the electronic parking brake system according to an embodiment.

Referring to FIG. 3, the electronic parking brake system 30 may include a controller 200 configured to perform an overall control related to an operation of the electronic parking brake 100.

A current sensor 300 may be electrically connected to an input side of the controller 200.

A communication interface 310 may be electrically connected to the input side and an output side of the controller 200.

A motor driving circuit 320 may be electrically connected to the output side of the controller 200.

The current sensor 300 may detect a current flowing through the electric motor 141. For example, the current sensor 300 may detect a motor current flowing through the electric motor 141 using a shunt resistor or a Hall sensor. In addition to the shunt resistor or the Hall sensor, various methods capable of detecting the motor current are applicable to the current sensor 300. The current sensor 300 may transmit detected current information to the controller 200.

The communication interface 310 may transmit and receive communication signals to and from the electronic brake system 10 and the driver assistance system 20 through the vehicle communication network NT. The communication interface 310 may include a CAN transceiver.

The motor driving circuit 320 may rotate the electric motor 141 forward or backward. For example, the motor driving circuit 320 may include an H-bridge circuit including a plurality of power switching elements to rotate the electric motor 141 forward and backward. During a parking operation in which the electric motor 141 rotates in one direction by the motor driving circuit 320, the one-way rotation of the electric motor 141 may be decelerated while passing through the speed reducer 142 to rotate the spindle member 135 in one direction with a large force. When the spindle member 135 rotates in one direction, an axial movement of the nut member 131 may be performed. When the nut member 131 presses the piston 121, the two brake pads 113 press the brake disc D so that the wheel may be braked. A parking operation release may be performed opposite to the parking operation.

The controller 200 may be referred to as an electronic control unit (ECU).

The controller 200 may include a processor 210 and a memory 220.

The memory 200 may store a program for processing or controlling the processor 210 and various data for operating the electronic parking brake system.

The memory 220 may include a non-volatile memory such as a flash memory, a read only memory (ROM), and an erasable programmable read only memory (EPROM), as well as a volatile memory such as S-RAM and D-RAM.

The processor 210 may control overall operations of the electronic parking brake system 30.

The controller 200 having the above configuration may rotate the electric motor 141 forward or backward through the motor driving circuit 320.

The controller 200 may perform a parking operation mode or a parking release mode by an operation signal of a parking switch operated by the driver or an operation signal generated by a program related to operation of the electronic parking brake.

The controller 200 may, in the parking operation mode, perform the parking operation (Parking Apply) in which as the nut member 131 is moved in the forward direction by the rotation of the electric motor 141 in one direction, the piston 121 is pressed so that the brake pad 113 comes into close contact with the brake disc D to generate a clamping force.

The controller 200 may, in the parking release mode, perform the parking operation release (Parking Release) in which as the nut member 131 is moved in the backward direction by the rotation of the electric motor 141 in the reverse direction, the pressing of the piston 121 is released so that the brake pad 113 in close contact with the brake disc D is released to release the generated clamping force.

The controller 200 may estimate the temperature of the brake disc, determine the temperature of the electric motor 141 depending on the estimated temperature of the brake disc, determine the clamping force required for parking based on the determined motor temperature, determine a target current depending on the determined clamping force, and control the electric motor 141 depending on the determined target current.

The controller 200 may determine first thermal energy Qheat to be generated depending on a wheel speed and a wheel pressure during vehicle braking, determine second thermal energy Qcool to be cooled depending on a vehicle speed, and determine the temperature of the brake disc based on the determined first thermal energy Qheat and the second thermal energy Qcool.

The controller 200 may request the electronic brake system 10 and/or the driver assistance system 20 through the communication interface 310 to receive information necessary to estimate the temperature of the brake disc D.

The controller 200 may request the electronic brake system 10 and/or the driver assistance system 20 through the communication interface 310 to receive a wheel pressure, a wheel speed, an ambient temperature, a radius of the brake disc, a friction coefficient of the brake pad, a specific heat of the brake disc, a mass of the brake disc, a radius of the wheel, and the like. For reference, in a case where there is a system capable of providing information necessary for estimating the temperature of the brake disc D, the controller 200 may receive a signal for the information from the system instead of the electronic brake system 10 and the driver assistance system 20.

FIG. 4 illustrates an exchange of thermal energy of a brake disc in the electronic parking brake system according to an embodiment. FIG. 5 is a diagram illustrating energy conversion during braking in the electronic parking brake system according to an embodiment. FIG. 6 is a diagram illustrating energy conversion when the braking is released in the electronic parking brake system according to an embodiment. FIG. 7 is a diagram illustrating estimation of a motor temperature in the electronic parking brake system according to an embodiment.

Referring to FIGS. 4 to 7, the controller may calculate the thermal energy Qheat generated depending on the wheel speed and wheel pressure during the vehicle braking, calculate the cooled thermal energy Qcool depending on the vehicle speed, predict the temperature of the brake disc D by calculating the thermal energy that the brake disc D currently has due to a difference between these two thermal energies, and predict the temperature of the electric motor 141 depending on the predicted temperature of the brake disc D.

More specifically, FIG. 4 illustrates a form of thermal energy exchange generated when the vehicle is braked. The braking system of the vehicle serves to reduce the vehicle speed by converting kinetic energy into thermal energy by friction and dissipating the thermal energy into the air.

As a hydraulic system operates when the driver presses the brake pedal in order to reduce the vehicle speed while driving, pressure is applied to the brake pads 113. When a frictional force is generated by contact between the brake pad 113 and the brake disc D, the kinetic energy of the vehicle is converted into frictional energy between the brake pad 113 and the brake disc D. The frictional energy is converted into thermal energy, some of which escapes into the air and is also absorbed by the brake pad 113 and the brake disc D. The thermal energy absorbed by the brake pad 113 and the brake disc D increases the temperature of the brake pad 113 and the brake disc D. Conversely, as the thermal energy absorbed by the brake disc D escapes to the surrounding components connected or into the ambient atmosphere in the form of conduction, convection, and radiation while the vehicle is driving without braking or is in a stopped state, the temperature of the brake disc decreases. A mathematical model for calculating the temperature of the brake disc D may be created by using this conversion process of thermal energy.

The frictional energy generated by the frictional force is converted into the thermal energy Qheat and absorbed by the brake disc D.

The thermal energy Qheat generated by the frictional force may be expressed as a function as in the following Equation [1].

$$Q\text{heat} = f(\mu\text{pad}, P\text{wheel}, \omega\text{wheel}, R\text{disc}, R\text{wheel}) \quad \text{Equation [1]}$$

Herein, μpad is a friction coefficient of the brake pad, Pwheel is a wheel pressure, ωwheel is a wheel speed, Rdisc is a radius of the brake disc, and Rwheel is a radius of the wheel.

When the vehicle drives without braking or is in the stopped state, the thermal energy absorbed by the brake pad 113 and the brake disc D is transferred to the ambient atmosphere or connected components in the form of conduction, convection, radiation, or the like. The brake disc D is in direct contact with a hub portion of the wheel. The energy by which heat is transferred in the form of conduction through surfaces in contact may be expressed as Qconduction.

Most of the heat energy escapes into the air in the form of convection, and in this case, the energy of convective heat transfer may be expressed as Qconvection.

When the brake disc D is at a high temperature above a certain level, the energy of heat transfer by radiation may be expressed as Qradiation.

A sum Qcool of thermal energy that escapes from the brake disc D in the form of conduction, convection, and radiation may be expressed as the following Equation [2] by adding all of the thermal energy.

$$Q\text{cool} = Q\text{conduction} + Q\text{convection} + Q\text{radiation} \quad \text{Equation [2]}$$

The thermal energy Qcool cooled depending on the vehicle speed may be expressed as the following Equation [3].

$$Q\text{cool} = f(\omega\text{wheel}, T\text{air}, R\text{disc}, R\text{wheel}) \quad \text{Equation [3]}$$

Herein, Tair is the atmospheric temperature.

The final temperature of the brake disc D is determined by a difference between the heat energy Qheat absorbed for a specific time and the heat energy Qcool transferred to the outside. The current temperature Tdisc of the brake disc D as an amount of change in temperature due to the difference between the two thermal energies may be expressed as the following Equation [4].

$$T_{disc} = \frac{Q_{heat} - Q_{cool}}{C_{disc} \times M_{disc}} \quad \text{Equation [4]}$$

Herein, Cdisc is a specific heat of the brake disc, and Mdisc is a mass of the brake disc.

While the vehicle is driving, the temperature Tdisc of the brake disc D may be continuously calculated. When the vehicle is parked and the parking operation is requested, the temperature of the electric motor 141 may be determined from the temperature Tdisc of the brake disc D.

The temperature of the electric motor 141 may be expressed as the following Equation [5].

$$T_{motor} = \varepsilon \times T_{disc} \quad \text{Equation [5]}$$

Herein, ε is a correction coefficient.

FIG. 8 is a graph illustrating a temperature relationship between the brake disc and the motor in the electronic parking brake system according to an embodiment.

Referring to FIG. 8, because the caliper housing 120 has an effect of blocking the heat transferred to the electric motor 141 from the brake disc D, the actual temperature of the electric motor 141 is lower than the temperature Tdisc of the brake disc D.

FIG. 9 illustrates a pattern of a current input to the electric motor during a parking operation in the electronic parking brake system according to an embodiment. FIG. 10 is a graph illustrating that a clamping force and a target current are determined depending on the motor temperature in the electronic parking brake system according to an embodiment.

Referring to FIGS. 9 and 10, as a parking switch signal is input, the parking operation function is executed.

The operation of the electric motor 141 may be started depending on a request for parking operation, an operation process may be determined as the motor current generated during the operation of the motor is measured, and it may be finally determined whether the operation is completed.

Three sections may be largely divided depending on the characteristics of a change in current value. When the current is initially transmitted to the electric motor 141, a large amount of current is needed instantaneously because of the inertia to remain stopped. Therefore, there is a section in which the current rapidly increases, which is referred to as an in-rush current section. Thereafter, there is a section in which the electric motor 141 rotates to push the brake pad 113 in the direction of the brake disc D, which is referred to as a no-load section because there is no load other than a weight of the brake pad 113. Finally, a section in which the brake pad 113 comes into contact with the brake disc D and compresses the brake disc D until reaching the target current to generate a clamping force is referred to as a load section.

An end point of the parking operation function is a time point in which the load section continues to some extent and a sufficient clamping force is generated to park the vehicle, and in MoC, this time point may be determined only by the measured current, so that a target current value is set in advance.

During the parking operation, the temperature Tdisc of the electric motor 141 may be determined depending on the temperature Tdisc of the brake disc D. In the load section, the temperature Tdisc of the electric motor 141 may be determined depending on the temperature Tdisc of the brake disc D.

The controller 200 may maintain the target current as a first target current (target current 1) having a preset reference current value when the temperature Tdisc of the electric motor 141 is within a preset first temperature range. The controller 200 may drive the electric motor 141 until the motor current detected by the current sensor 300 reaches the first target current, and may terminate a parking operation control when the current flowing through the electric motor 141 reaches the first target current. Accordingly, a first clamping force corresponding to the motor temperature, which is a normal temperature, may be generated.

The controller 200 may change the target current to a second target current (target current 2) having a current value larger than that of the first target current when the temperature Tdisc of the electric motor 141 is within a second temperature range higher than the preset first temperature range.

The controller 200 may drive the electric motor 141 until the motor current detected by the current sensor 300 reaches the second target current, and may terminate the parking operation control when the current flowing through the electric motor 141 reaches the second target current. Accordingly, a second clamping force (second clamping force>first clamping force) corresponding to the motor temperature, which is a first high temperature higher than the normal temperature, may be generated.

The controller 200 may change the target current to a third target current (target current 3) having a current value larger than that of the second target current when the temperature Tdisc of the electric motor 141 is within a third temperature range higher than the preset second temperature range.

The controller 200 may drive the electric motor 141 until the motor current detected by the current sensor 300 reaches the third target current, and may terminate the parking operation control when the current flowing through the electric motor 141 reaches the third target current. Accordingly, a third clamping force (third clamping force>second clamping force) corresponding to the motor temperature, which is a second high temperature higher than the first high temperature, may be generated.

FIG. 11 is a flowchart illustrating a control method of the electronic parking brake system according to an embodiment.

Referring to FIG. 11, the controller 200 repeatedly determines the temperature Tdisc of the brake disc D while the vehicle is driving (400).

The controller 200 may determine whether the parking operation is in a started state (402). In this case, the controller 200 may determine that the parking operation is in the started state when the parking switch is turned on.

When the parking operation is not in the started state as a result of the determination of operation 402, the controller 200 may return to operation 400 to perform the following operations.

On the other hand, when the parking operation is in the started state as a result of the determination of operation 402, the controller 200 may determine the temperature Tmotor of the electric motor 141 depending on the determined temperature Tdisc of the brake disc D (404).

The controller 200 may determine the clamping force depending on the determined temperature Tmotor of the electric motor 141 (406).

The controller 200 may determine the target current depending on the determined clamping force (408).

The controller 200 may control the electric motor 141 depending on the determined clamping force to generate the determined clamping force (410).

As such, because the target current is fixed regardless of the motor temperature in the prior art, the motor performance deteriorates when the motor temperature rises, and thus the braking performance of the system may not be kept constant.

However, the electronic parking brake system according to an embodiment may vary the clamping force required for parking by estimating the motor temperature from the temperature of the brake disc during the parking operation, and thus the clamping force may be flexibly controlled for each motor temperature, so that the braking performance of the system may be kept constant.

FIG. 12 is a flowchart illustrating a control method of the electronic parking brake system according to another embodiment.

Referring to FIG. 12, the controller 200 may determine whether the parking operation is in the started state (500).

When the parking operation is not in the started state as a result of the determination of operation 500, the controller 200 may determine the first heat energy Qheat to be generated during the vehicle braking by receiving information, for example, the wheel pressure, the wheel speed, the ambient temperature, the radius of the brake disc, the friction coefficient of the brake pad, the specific heat of the brake disc, the mass of the brake disc, the radius of the wheel, and the like necessary for estimating the temperature Tdisc of the brake disc D from other systems in the vehicle through the communication interface 310 (502), and may determine the second thermal energy Qcool to be cooled when the vehicle braking is released (504).

The controller 200 may calculate the temperature Tdisc of the brake disc D based on the determined first heat energy Qheat and the determined second heat energy Qcool (506).

On the other hand, when the parking operation is in the started state as a result of the determination of operation 500, the controller 200 may determine the temperature Tmotor of the electric motor 141 depending on the calculated temperature Tdisc of the brake disc D (508).

The controller 200 may determine the target current depending on the determined temperature Tmotor of the electric motor 141 (510).

The controller 200 may control the electric motor 141 depending on the determined target current (512).

As described above, the present disclosure may keep the braking performance of the system constant by varying the clamping force required for parking depending on the motor temperature.

The invention claimed is:

1. An electronic parking brake system comprising a motor actuator operated by an electric motor, wherein the electronic parking brake system further comprises:
   a motor driving circuit provided to drive the electric motor; and
   a controller configured to determine a temperature of the electric motor from a temperature of a brake disc during a parking operation, determine a target current based on the determined motor temperature, and control the electric motor depending on the determined target current,
   wherein the controller is configured to determine a first thermal energy to be generated during vehicle braking, determine a second thermal energy to be cooled when the braking of the vehicle is released, and determine the temperature of the brake disc based on the determined first thermal energy and the determined second thermal energy.

2. The electronic parking brake system according to claim 1, wherein
   the controller is configured to determine a clamping force required for parking based on the determined motor temperature and determine the target current depending on the determined clamping force.

3. The electronic parking brake system according to claim 1, wherein
   the controller is configured to determine the target current as a higher value as the determined motor temperature is higher.

4. The electronic parking brake system according to claim 1, wherein
   the controller is configured to calculate the first thermal energy depending on a friction coefficient of a brake pad, a wheel pressure, a wheel speed, a radius of the brake disc, and a radius of a wheel.

5. The electronic parking brake system according to claim 1, wherein
   the controller is configured to calculate the second thermal energy depending on a wheel speed, an ambient temperature, a radius of the brake disc, and a radius of a wheel.

6. The electronic parking brake system according to claim 1, wherein
   the controller is configured to calculate the temperature of the electric motor ($T_{motor}$) by the following equation, $$T_{motor} = \varepsilon \times T_{disc}$$

and herein, Tdisc is the temperature of the brake disc, and ε is a correction coefficient.

7. A control method of an electronic parking brake system comprising a motor actuator operated by an electric motor, the control method comprising:

determining a temperature of the electric motor from a temperature of a brake disc during a parking operation;

determining a target current based on the determined motor temperature; and controlling the electric motor depending on the determined target current, wherein the determining the temperature of the electric motor includes determining a first thermal energy to be generated during vehicle braking, determining a second thermal energy to be cooled when the braking of the vehicle is released, and determining the temperature of the brake disc based on the determined first thermal energy and the determined second thermal energy.

8. The control method according to claim 7, wherein the determining of the target current includes determining a clamping force required for parking based on the determined motor temperature, and determining the target current depending on the determined clamping force.

9. The control method according to claim 7, wherein the determining of the first thermal energy includes calculating the first thermal energy depending on a friction coefficient of a brake pad, a wheel pressure, a wheel speed, a radius of the brake disc, and a radius of a wheel.

10. The control method according to claim 7, wherein the determining of the second thermal energy includes calculating the second thermal energy depending on a wheel speed, an ambient temperature, a radius of the brake disc, and a radius of a wheel.

11. The control method according to claim 7, wherein the determining of the temperature of the electric motor includes calculating the temperature of the electric motor ($T_{motor}$) by the following equation, $$T_{motor} = \varepsilon \times T_{disc}$$

and herein, Tdisc is the temperature of the brake disc, and ε is a correction coefficient.

* * * * *